United States Patent

[11] 3,588,384

[72] Inventor Marvin C. Negley
 Clarinda, Iowa
[21] Appl. No. 784,101
[22] Filed Dec. 16, 1968
[45] Patented June 28, 1971
[73] Assignee Electro Voice, Incorporated
 Buchanan, Mich.

[54] HEADSET INCORPORATING A MICROPHONE AND AN EARPHONE
 24 Claims, 7 Drawing Figs.

[52] U.S. Cl. .................................................. 179/156,
 179/180
[51] Int. Cl. ...................................................H04m 1/05,
 H04r 1/28
[50] Field of Search........................................... 179/156,
 179, 147, 180

[56] References Cited
 UNITED STATES PATENTS

| | | | |
|---|---|---|---|
| 2,485,405 | 10/1949 | Olney et al.................... | 179/102 |
| 2,933,145 | 4/1960 | DiMattia...................... | 179/156X |
| 3,184,556 | 5/1965 | Larkin.......................... | 179/156 |
| 3,280,273 | 10/1966 | Flygstad et al................ | 179/156 |
| 3,381,773 | 5/1968 | Schenkel...................... | 179/180X |
| 3,388,767 | 6/1968 | Wilson......................... | 179/156X |

Primary Examiner—William C. Cooper
Attorney—Burmeister, Palmatier and Hamby

ABSTRACT: A dynamic microphone transducer and an earphone transducer are mounted in front and rear half-shells which fit together to form a casing. Sound is brought to the microphone transducer by a voice tube extending forwardly from the front half-shell. An ear tube is connected to the rear half-shell to carry the sound from the earphone transducer to the ear of the user. Porous discs made of sintered metal are preferably mounted in the tubes for damping resonances therein. The headset is supported by a mounting member having front and rear clips of generally circular curvature for resiliently engaging the half-shells to hold them together. The half-shells are preferably formed with recesses for receiving the clips in substantially flush relation to the half-shells. The mounting member preferably includes a temple clip for mounting the headset on one of the temples of a pair of eyeglasses. A swivel joint is preferably provided between the temple clip and the front and rear clips.

INVENTOR
Marvin C. Negley
by Burmeister, Palmatier
and Hamby Att'ys

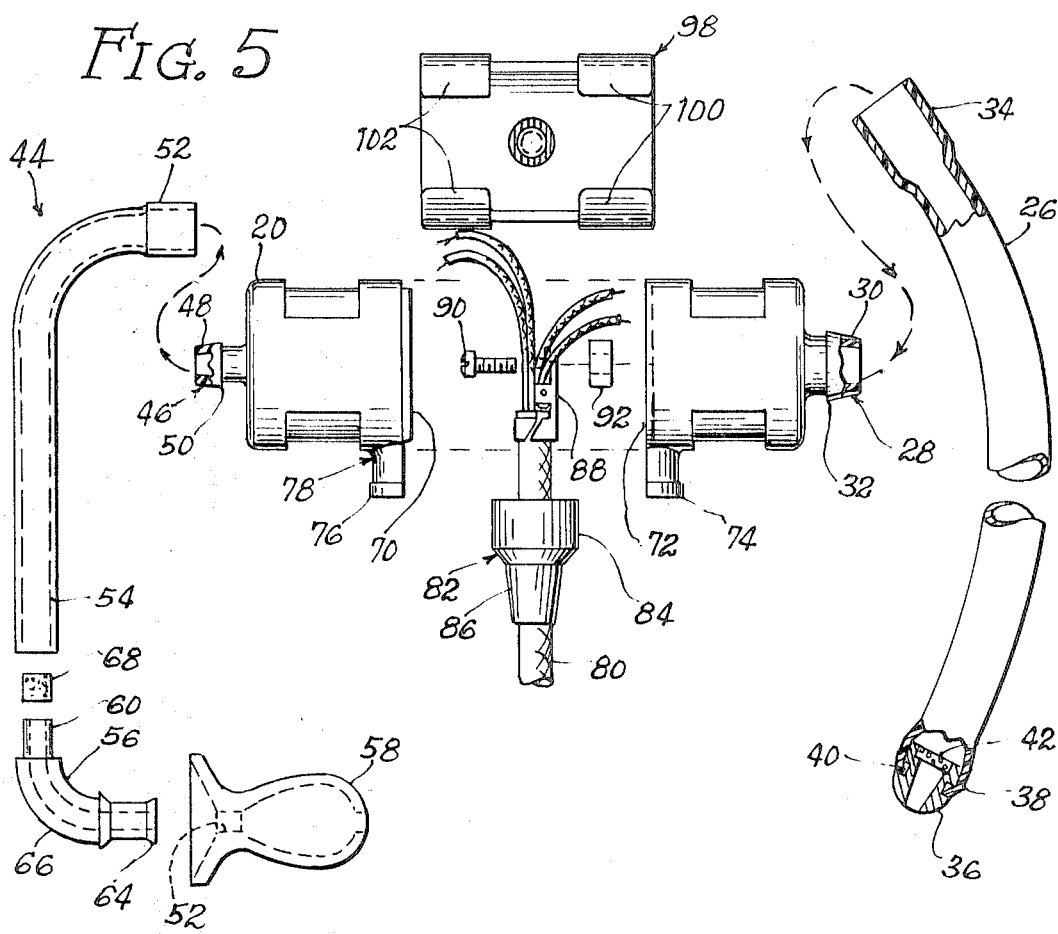
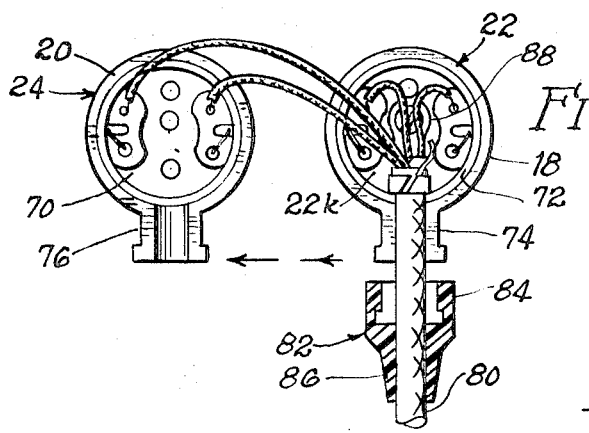
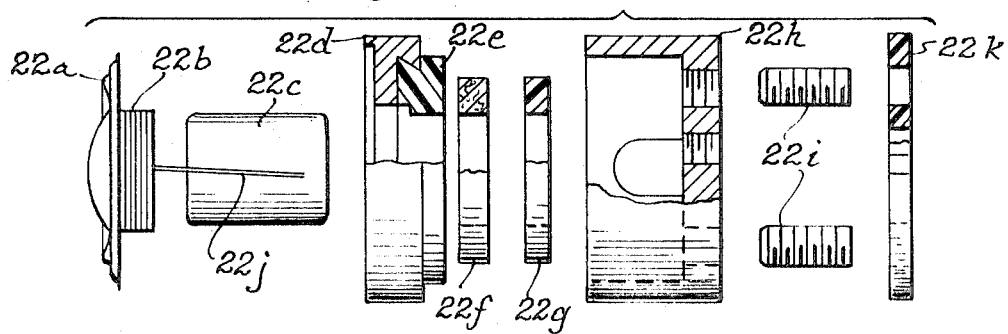

HEADSET INCORPORATING A MICROPHONE AND AN EARPHONE

This invention relates to a headset which incorporates both a microphone and an earphone, and thus may be used very advantageously in various communications services. For example, the headset is especially well adapted for use by airplane pilots and other crew members in connection with radio and intercom equipment.

The headset of the present invention is extremely small and light in weight, so that it may be used with great comfort and convenience over a long period of time. The headset is so small and light that it may be mounted very advantageously on one of the temples of a pair of eyeglasses.

While the concept of a temple type headset has been disclosed in the prior art, the headset of the present invention is much more advantageous than anything disclosed previously. Thus, for example, the headset of the present invention is constructed so that it may be assembled and disassembled without the use of tools. Accordingly, the manufacture of the headset is greatly facilitated. Moreover, it is easy to service the headset in the field, if maintenance is ever necessary.

In general, the headset of the present invention comprises a casing which is divided into first and second half-shells which are normally directed forwardly and rearwardly. The half-shells are preferably in the form of generally cylindrical cups, adapted to fit together with their open ends opposite each other. A microphone transducer is mounted in the first half-shell, while an earphone transducer is mounted in the second half-shell. A microphone tube extends from the first half-shell to carry sounds to the microphone transducer. An earphone tube extends from the second half-shell to carry sounds from the earphone transducer to the ear of the user. A mounting member is secured to the half-shells and is provided with means for holding them together in assembled relation. Preferably, such means comprise first and second clips on the mounting member, adapted to engage the first and second half-shells. The clips are preferably of a circular curvature and are adapted to be received in recesses formed in the half-shells. The recesses are formed in such a manner that the clips are flush with the half-shells. Preferably, the mounting member is equipped with a temple clip, adapted to be secured to one temple of a pair of eyeglasses. A swivel joint is preferably provided between the temple clip and the body of the mounting member. A headband may be substituted for the temple clip, if desired.

The half-shells preferably comprise semicircular lateral projections which form a tube or stub for receiving an electrical cable, whereby the necessary electrical connections are established to the microphone and earphone transducers.

Various other objects, advantages and features of the present invention will appear from the following description, taken with the accompanying drawings, in which.

Figure 1:
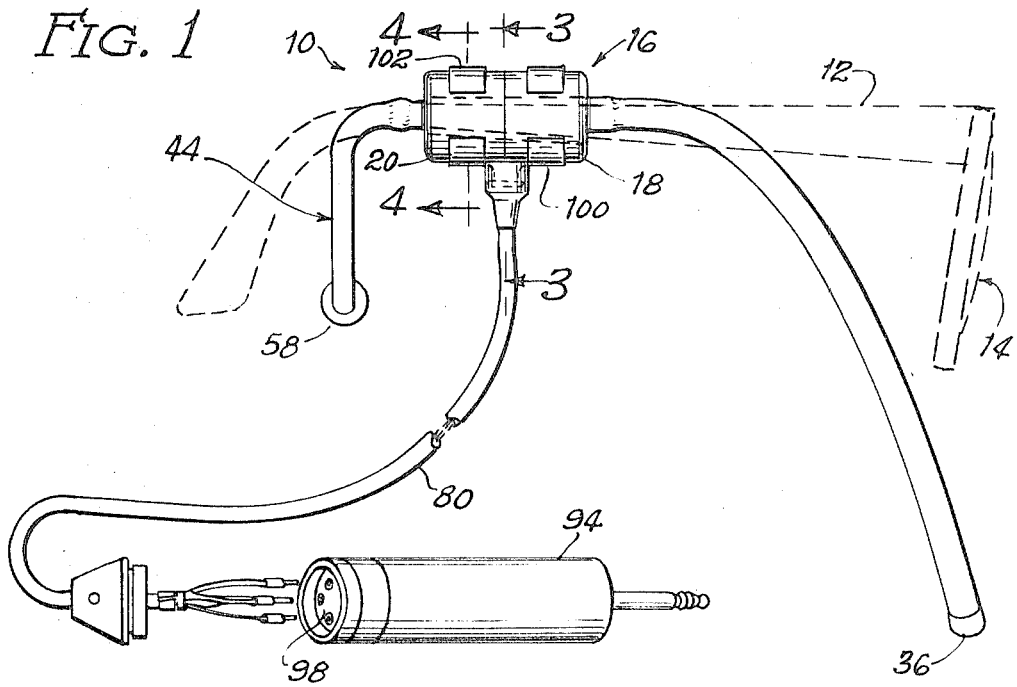
FIG. 1 is a general side elevation of a headset to be described as an illustrative embodiment of the present invention.
Figure 3:
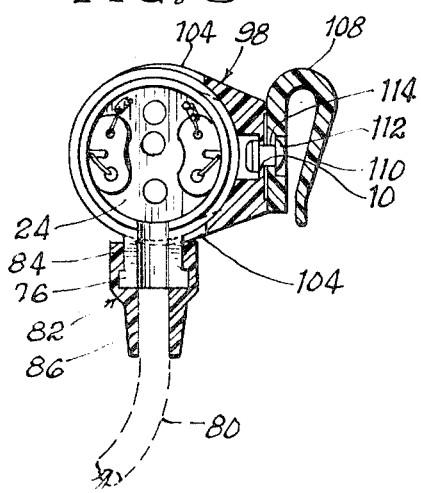
Figure 4:
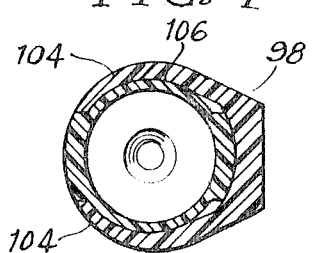

FIGS. 3 and 4 are sectional views, taken generally along the lines 3-3 and 4-4 in FIG. 1.

FIG. 5 is an exploded or disassembled view of the headset, with certain portions in section.

FIG. 6 is another exploded view with the components in different positions from those shown in FIG. 5.

FIG. 7 is an exploded view of the microphone transducer employed in the headset.

Figure 2:
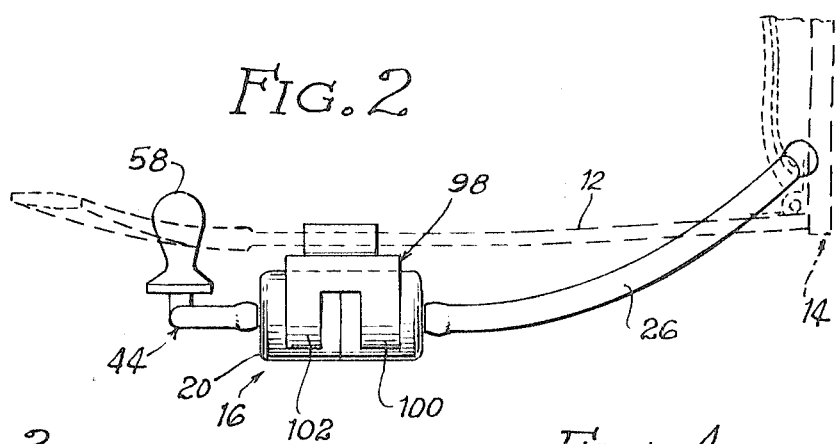
FIG. 2 is a top plan view of the headset.

As just indicated, FIGS. 1 and 2 illustrate the general construction of a headset 10, to be described as an illustrative embodiment of the present invention. The illustrated headset 10 is extremely compact and light in weight, and is adapted to be mounted on one of the temples 12 of a pair of eyeglasses 14. This style of mounting is generally very convenient for airplane pilots and other crew members who usually wear sunglasses. However, it is also very convenient to mount the headset on a suitable headband.

The illustrated headset 10 comprises a casing 16 which is divided into front and rear half-shells 18 and 20. Preferably, each half-shell is in the form of a generally cylindrical cup. The half-shells 18 and 20 may be molded at low cost from suitable plastic materials, but may also be made of metal or various other materials.

As shown to best advantage in FIG. 6, a microphone transducer 22 is mounted in the front half-shell 18 while an earphone transducer 24 is mounted in the rear half-shell 20. These transducers 22 and 24 may be generally cylindrical in shape. Preferably, they are of the dynamic or moving coil type. The transducers 22 and 24 may be slipped into and out of the half-shells 18 and 20 for easy assembly and disassembly.

As shown in FIG. 7, the microphone transducer 22 preferably comprises a diaphragm 22a which carries a movable voice coil 22b. A permanent magnet 22c is positioned within the voice coil 22b. The diaphragm 22a is cemented or otherwise secured to a mounting ring 22d. The magnet 22c is cemented or otherwise secured within a centering ring 22e, mounted on the ring 22d. Damping washers 22f and 22g may be mounted around the magnet 22c behind the ring 22e. As shown, a cup-shaped housing or pot 22h is mounted between the rear end of the magnet 22c and the rear side of the ring 22d. The ring 22d and the pot 22h are preferably made of magnetically permeable material. Set screws 22i may be threaded through the rear side of the pot 22h to press the washers 22f and g against the ring 22e. The voice coil 22b has leads 22j which are connected to a terminal board 22k, disposed behind the pot 22h.

When the diaphragm 22a is vibrated by sound waves, the voice coil 22b is moved relative to the magnet 22c, with the result that voltages are induced in the voice coil. The earphone transducer 24 may be of a construction similar to that of the microphone transducer 22. Each of the transducers 22 and 24 has a substantially flat frequency response over a wide frequency range, so as to afford a high degree of fidelity.

A microphone tube 26 projects forwardly from the front half-shell 18 and is adapted to carry sounds to the microphone transducer 22. The microphone tube 26 is curved so as to extend to a point near the mouth of the user. The microphone tube 26 may be made of plastic or some other suitable material.

As shown to best advantage in FIG. 5, the microphone tube 26 is preferably mounted on a hollow tubular stub or nipple 28 projecting forwardly from the front half-shell 18. The illustrated stub 28 has a tapered end portion 30 to receive the microphone tube 26. An annular shoulder 32 is formed on the stub 28 at the rear end of the tapered portion 30. As shown, the microphone tube 26 has an enlarged rear end portion, adapted to be tightly fitted around the tapered portion 30 and the shoulder 32. When the microphone tube 26 is in place, the shoulder 32 acts in the manner of a barb to retain the enlarged portion 34.

A hollow tip 36 is mounted on the front end of the illustrated microphone tube 26. The tip 36 may be made of various plastics or other suitable materials. As shown, the tip 36 is inserted into an enlarged portion 38 formed on the front end of the microphone tube 26. The end of the enlarged portion 38 is bent or crimped into an annular peripheral groove 40 formed in the tip 36. In this way the tip 36 is securely retained.

To improve the fidelity of the microphone, it is preferred to mount a damping member 42 in the microphone tube 26. In this case, the damping member 42 is in the form of a porous disc, tightly fitted into the rear portion of the tip 36. The porous disc 42 may be made of sintered metal, preferably sintered stainless steel. The porous disc 42 provides for the passage of sound along the microphone tube 26, while affording a damping action to suppress resonances in the tube. The suppression of such resonances reduces the magnitude of resonant peaks and extends the frequency response, with the result that the fidelity of the microphone is greatly improved.

An earphone tube 44 extends from the rear half-shell 20 to carry sounds to the ear of the user. The earphone tube 44 is preferably made of a flexible plastic material, but may be made of various other materials.

As shown, the earphone tube 44 is connected to a hollow tubular stub or nipple 46 projecting axially from the rear half-shell 20. The stub 46 has a tapered rear portion 48 formed with an annular shoulder 50 at its front end. As illustrated, the earphone tube 44 has an enlarged end portion 52, adapted to be tightly fitted around the stub 46. The tapered portion 48 makes it easy to push the enlarged portion 52 around the stub 46.

It will be seen that the earphone tube 46 is bent so as to extend downwardly and then laterally into the ear of the user. As shown, the earphone tube 44 comprises an upper L-shaped section 54, a lower L-shaped section 56, and a tip 58 adapted to extend into the ear canal of the user. The lower section 56 has a reduced upper end portion 60 which may be snugly fitted into the upper section 54 to provide a swivel joint, which allows for adjustment of the angle of the lower section 56.

The tip 58 is adapted to be fitted around the end of the lower section 56. Thus, the tip 58 has an inner po45ion 62 of reduced inside diameter, adapted to be retained between flanges 64 and 66 on the end of the lower section 56.

To improve the fidelity of the earphone, it is preferred to mount a damping member 68 in the earphone tube 44. As shown, the damping member 68 is in the form of a porous disc or cylinder, snugly fitted into the lower portion of the upper section 54. As before, the porous disc 68 is preferably made of sintered stainless steel or some other sintered metal. The porous disc 68 provides for the passage of sounds along the earphone tube 44, while affording a damping action to suppress resonances in the tube. In this way, the fidelity of the earphone is greatly improved.

The front and rear half-shells 18 and 20 fit together in axially aligned relation. Thus, the open rear end of the front half-shell 18 fits against the open front end of the rear half-shell 20.

Formations are preferably provided on the half-shells 18 and 20 to keep them in axial alignment. As shown, the rear half-shell 20 is formed with a flange or tongue 70, adapted to fit into a recess or groove 72 in the front half-shell 18. The positions of these interfitting parts could be reversed. Moreover, various other interfitting parts could be provided.

The illustrated half-shells 18 and 20 are formed with hollow semicircular member 74 and 76 projecting laterally to form a tubular stub 78 for an electrical cable or cord 80. The cable 80 provides the necessary electrical connections to the microphone and earphone transducers 22 and 24. A sleeve or cover 82 is preferably fitted around the outside of the stub 78 to exclude dust from the casing 18 and to prevent any undue strain upon the electrical cable 80 where it enters the stub 78. The sleeve 82 has an enlarged portion 84 which fits snugly around the stub 78. The other end of the sleeve 82 is formed with a smaller portion 86 which fits snugly around the cable 80.

As shown, a metal lug 88 is clamped or otherwise secured to the end of the cable 80. A single screw 90 may be employed to secure the lug 88 to the microphone transducer 22, with a spacing washer 92 therebetween. The lug 88 may afford a ground connection between the microphone transducer 22 and the shield of the cable 80.

As shown in FIG. 1, a plug or other connector 94 is connected to the end of the cable 80. A transistorized amplifier 96 is preferably mounted within the plug 94. The amplifier 96 provides a preamplifier for the microphone transducer 22.

The casing 16 of the headset 10 is provided with a mounting member 98, adapted to support the headset on the temple 12 of the eyeglasses 14, while also holding the half-shells 18 and 20 together in assembled relation. The illustrated mounting member 98 is in a disengageable clamping relation to the half-shells 18 and 20. Preferably, the mounting member 98 comprises front and rear clips or clamps 100 and 102, adapted to engage the front and rear half-shells 18 and 20.

As shown to best advantage in FIGS. 2—4, the clips 100 and 102 comprise flexible resilient fingers 104 having a circular curvature. The fingers 104 are adapted to be snapped around the half-shells 18 and 20. Preferably, the half-shells are formed with recesses 106 for receiving the fingers 104 so that the clips 100 and 102 will be flush with the half-shells 18 and 20. The snug engagement between the fingers 104 and the recesses 106 prevents any relative movement between the half-shells 18 and 20 when the clips 100 and 102 are mounted on the half-shells.

As shown to best advantage in FIG. 3, the mounting member 98 is provided with a temple clip 108 which is generally U-shaped and is adapted to snap over the temple 12 of the eyeglasses 14. The clip 108 has an outer leg 110 which is tapered for greater flexibility and comfort.

A swivel joint is preferably provided between the temple clip 108 and the mounting member 98. As shown, the swivel joint is provided by a rivet 112 which extends through an opening 114 in the inner leg 116 of the clip 108. The rivet 112 also extends through an opening 118 in the mounting member 98. It will be seen that the rivet 112 is recessed into the inner leg 116 so that the rivet will not interfere with the mounting of the clip 108 on the temple 12 of the eyeglasses 14.

The rivet 112 provides a swivel whereby the angle of the headset may be adjusted relative to the temple 12 of the eyeglasses 14. It will be understood that the clip 108 may be mounted on a suitable headband, rather than on the temple 12. Alternatively, a headband may be substituted for the clip 108.

The headset 10 may readily be disassembled in the field by removing the clips 100 and 102 from the half-shells 18 and 20. The sleeve 82 is also removed from the cable stub 78. It is then possible to separate the half-shells 18 and 20. Moreover, the microphone and earphone transducers 22 and 24 may be removed from the half-shells 18 and 20. Thus, any defective part may readily be replaced. The headset may then be reassembled by snapping the clips 100 and 102 into the recesses 106 in the half-shells 18 and 20.

It is easy to adjust the headset 10 so that the earphone tube 44 fits properly into the ear of the user. The temple clip 108 may be slid along the temple 12 of the eyeglasses 14. Moreover, the casing 16 may be swiveled about the rivet 112 to change the angle of the headset. The lower section 56 of the earphone tube 44 may be swiveled relative to the upper section 54. While these adjustments will accommodate most situations, the upper section 54 may also be supplied in various sizes.

The illustrated headset is shown as being right-handed in that the headset is adapted to be mounted on the right-hand temple 12 of the eyeglasses 14. However, the headset is reversible so that it may be arranged to be left-handed, adapted to be mounted on the left-hand temple. To provide such reversibility, the recesses 106 in the half-shells 18 and 20 are disposed at diametrically opposite points and are symmetrical, so that the clips 100 and 102 are reversible between the left and right-hand sides of the casing 16. This will be evident from FIG. 4, from which it will be seen that the mounting member 98 may readily be reversed from right to left.

Thus, when the headset is to be made left-handed rather than right-handed, the clips 100 and 102 are disengaged from the half-shells 18 and 20 and the mounting member 98 is moved to the other side of the casing 16, whereupon the clips are again snapped around the half-shells and into the recesses 106. The direction of the ear tube is reversed from left to right by turning the lower section 56 about the swivel joint 60. The microphone tube 26 is repositioned and may be bent as necessary. Alternatively, the right-handed microphone tube may be replaced with a left-handed tube.

Various other modifications, alternative constructions and equivalents may be employed, as will be understood by those skilled in the art.

I claim:

1. A headset, comprising the combination of a casing including first and second half-shells,
a microphone transducer mounted in said first half-shell, a microphone tube extending from said first half-shell for carrying sounds to said microphone transducer, an earphone transducer mounted in said second half-shell, an ear tube extending from said second half-shell for carrying sounds from said earphone transducer to the ear of the user, and a mounting device having means removably engaging said first and second half-shells for retaining said half-shells in assembled relation.

2. A headset according to claim 1, in which said means comprise clip means resiliently engaging said first and second half-shells.

3. A headset according to claim 1, in which said means comprise first and second clips resiliently engaging said first and second half-shells.

4. A headset according to claim 1, in which said means comprise first and second clips of generally circular curvature resiliently engaging said first and second half-shells, said half-shells having curved formations for receiving and retaining said clips.

5. A headset according to claim 1, in which said half-shells are generally cylindrical in shape, said means including first and second clips of generally circular curvature resiliently engaging said half-shells.

6. A headset according to claim 5, in which said half-shells are formed with peripheral recesses for receiving and retaining said clips.

7. A headset according to claim 5, in which said half-shells are formed with recesses for receiving said clips in generally flush relation to said half-shells.

8. A headset according to claim 5, in which said mounting member comprises a temple clip connected to said first and second clips for fastening the headset to one of the temples of a pair of eyeglasses.

9. A headset according to claim 8, including a swivel mounting between said temple clip and said first and second clips.

10. A miniature headset according to claim 1, in which said mounting member comprises a temple clip for mounting the headset on one of the temples of a pair of eyeglasses.

11. A headset according to claim 10, including a swivel joint between said temple clip and said mounting member.

12. A miniature headset according to claim 1, in which said means comprise first and second clamps removably engaging said first and second half-shells, said mounting member including a temple clip connected to said clamps for mounting the headset on one of the temples of a pair of eyeglasses.

13. A headset according to claim 12, including a swivel joint between said temple clip and said clamps.

14. A headset according to claim 1, in which said half-shells comprise first and second laterally extending semicircular members fitting together to form a cable entrance tube, and a connecting cable mounted in said tube for supplying electrical connections to said transducers.

15. A headset according to claim 1, in which said first and second half-shells are generally in the form of cylindrical cups with open ends fitting together in axially aligned relation.

16. A headset according to claim 15, in which said half-shells are formed with interfitting parts for maintaining alignment therebetween.

17. A headset according to claim 16, in which said parts comprise a flange on one of said half-shells and a recess on the other half-shell for receiving said flange.

18. A headset according to claim 1, including a porous metal member mounted in said microphone tube for damping resonances therein.

19. A headset according to claim 1, including a porous metal member mounted in said earphone tube for damping resonances therein.

20. A headset according to claim 1, including porous metal members mounted in said tubes for damping resonances therein.

21. A headset according to claim 1, including damping means mounted in said microphone tube for suppressing resonances therein.

22. A headset according to claim 1, including damping means mounted in said earphone tube for suppressing resonances therein.

23. A headset according to claim 1, including damping means mounted on both of said tubes for suppressing resonances therein.

24. A headset according to claim 1, in which said half-shells are generally cylindrical in shape, said means including first and second clips of generally circular curvature resiliently engaging said half-shells, said half-shells being formed with peripheral recesses for receiving and retaining said clips, said clips being reversible between the left and right-hand sides of said half-shells.

PO-1050
(5/69)

UNITED STATES PATENT OFFICE
CERTIFICATE OF CORRECTION

Patent No. 3,588,384   Dated June 28, 1971

Inventor(s) Marvin C. Negley

It is certified that error appears in the above-identified patent and that said Letters Patent are hereby corrected as shown below:

Column 3, line 20, "po45ion" should read --portion--.

In Fig. 5 of the drawings, "52" should be read as --62-- where it is applied to the inner portion of the tip 58.

Signed and sealed this 15th day of February 1972.

(SEAL)
Attest:

EDWARD M.FLETCHER,JR.        ROBERT GOTTSCHALK
Attesting Officer            Commissioner of Patents